(12) United States Patent
Asher

(10) Patent No.: US 10,434,826 B1
(45) Date of Patent: Oct. 8, 2019

(54) VEHICLE TIRE MONITORING SYSTEM

(71) Applicant: Nissan North America, Inc., Franklin, TN (US)

(72) Inventor: Simon Asher, Windsor (CA)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/023,343

(22) Filed: Jun. 29, 2018

(51) Int. Cl.
*B60C 23/04* (2006.01)

(52) U.S. Cl.
CPC ...... *B60C 23/0416* (2013.01); *B60C 23/0488* (2013.01); *B60C 23/0489* (2013.01)

(58) Field of Classification Search
CPC ..... B60C 23/02; B60C 23/04; B60C 23/0401; B60C 23/0405; B60C 23/0406; B60C 23/0408; B60C 23/0415; B60C 23/0416; B60C 23/042; B60C 23/0433; B60C 23/0479; B60C 23/0488; B60C 23/0489; B60C 23/0494; B60C 23/0496
USPC .................................. 340/426.33, 442–448
See application file for complete search history.

(56) References Cited

U.S. PATENT DOCUMENTS

| | | |
|---|---|---|
| 8,868,255 B2 | 10/2014 | Yoshioka et al. |
| 9,056,532 B1 | 6/2015 | Kavarana et al. |
| 9,233,581 B2 | 1/2016 | Fritz et al. |
| 9,592,710 B2 | 3/2017 | Okada et al. |
| 9,946,255 B2 | 4/2018 | Matters et al. |
| 2012/0158243 A1* | 6/2012 | Pupin ................. B62D 15/0295 701/36 |
| 2012/0242834 A1* | 9/2012 | Satoh ........................ B60R 1/00 348/148 |
| 2013/0128048 A1* | 5/2013 | Okajima ................. B60R 1/00 348/148 |
| 2013/0271574 A1* | 10/2013 | Dorrance ................. H04N 7/18 348/46 |
| 2014/0032031 A1 | 1/2014 | Okamura et al. |

(Continued)

FOREIGN PATENT DOCUMENTS

EP          2316709 B1     8/2013

OTHER PUBLICATIONS

"Radio-frequency identification" dated Jun. 10, 2018, https://en.wikipedia.org/w/index.php?title=Radio-frequency_identification&oldid=845253332.

*Primary Examiner* — Brian Wilson
(74) *Attorney, Agent, or Firm* — Global IP Counselors, LLP

(57) ABSTRACT

A vehicle tire monitoring system has an electronic controller in electronic communication with a rotation sensor, an input device and a signaling device. The electronic controller is configured to do at least the following. In response to the input device receiving a request to orient a valve stem of a tire with low air pressure to a predetermined orientation, the electronic controller determines that the valve stem is not currently in the predetermined orientation. The electronic controller operates the signaling device to provide a first signal to a vehicle passenger and/or the vehicle operator. Further, in response to receiving the request to orient the valve stem to the predetermined orientation and determining that the valve stem is currently in the predetermined orientation, the electronic controller operates the signaling device to provide a second signal indicating the need to rotate the tire to bring the valve stem to the predetermined orientation.

15 Claims, 5 Drawing Sheets

(56) References Cited

U.S. PATENT DOCUMENTS

| | | | |
|---|---|---|---|
| 2014/0232851 A1* | 8/2014 | Hough | H04N 7/181 348/118 |
| 2015/0158347 A1* | 6/2015 | Fritz | B60C 23/0401 340/442 |
| 2016/0159171 A1 | 6/2016 | Taki | |
| 2017/0278394 A1 | 9/2017 | Fuehrer | |

* cited by examiner

VEHICLE TIRE MONITORING SYSTEM

BACKGROUND

Field of the Invention

The present invention generally relates to vehicle tire monitoring system that monitors air pressure within vehicle tires. More specifically, the present invention relates to vehicle tire monitoring system that further determines whether or not the orientation of a valve stem of a tire with low air pressure is located in an uppermost orientation in order to make it easier for a person to add compressed air to the tire (inflate the tire) or to extract air from the tire (deflate the tire) without bending over toward the ground.

Background Information

Most vehicle include tire air pressure monitoring systems. Such systems are configured and designed to alert a vehicle operator when one of the vehicle tires has low air pressure.

SUMMARY

One object of the present disclosure is to make it possible to add compressed air to a tire with low air pressure without bending over toward the ground.

Another object of the present disclosure is to alert a vehicle operator to an angular location of a valve stem of a tire that has low air pressure.

In view of the state of the known technology, one aspect of the present disclosure is to provide a vehicle tire monitoring system with a vehicle body structure, a vehicle tire rotatably attached to the vehicle body structure, a valve stem attached to the vehicle tire, a rotation sensor, an input device, a signaling device and an electronic controller. The rotation sensor is configured to receive rotation data corresponding to rotation and position of the valve stem of the tire. The input device is configured to receive a request to orient the valve stem to a predetermined angular orientation. The signaling device is configured to provide a signal to at least one of a vehicle passenger and a vehicle operator. The electronic controller is installed within the vehicle body structure and is in electronic communication with the rotation sensor, the input device and the signaling device. The electronic controller is configured to:
  in response to the input device receiving a request to orient the valve stem to a predetermined orientation and determining that the valve stem is not currently in the predetermined orientation, the electronic controller operates the signaling device to provide a first signal to at least one of the vehicle passenger and the vehicle operator, and
  in response to the input device receiving the request to orient the valve stem to the predetermined orientation and determining that the valve stem is currently in the predetermined orientation, the electronic controller operates the signaling device to provide a second signal to at least one of the vehicle passenger and the vehicle operator.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
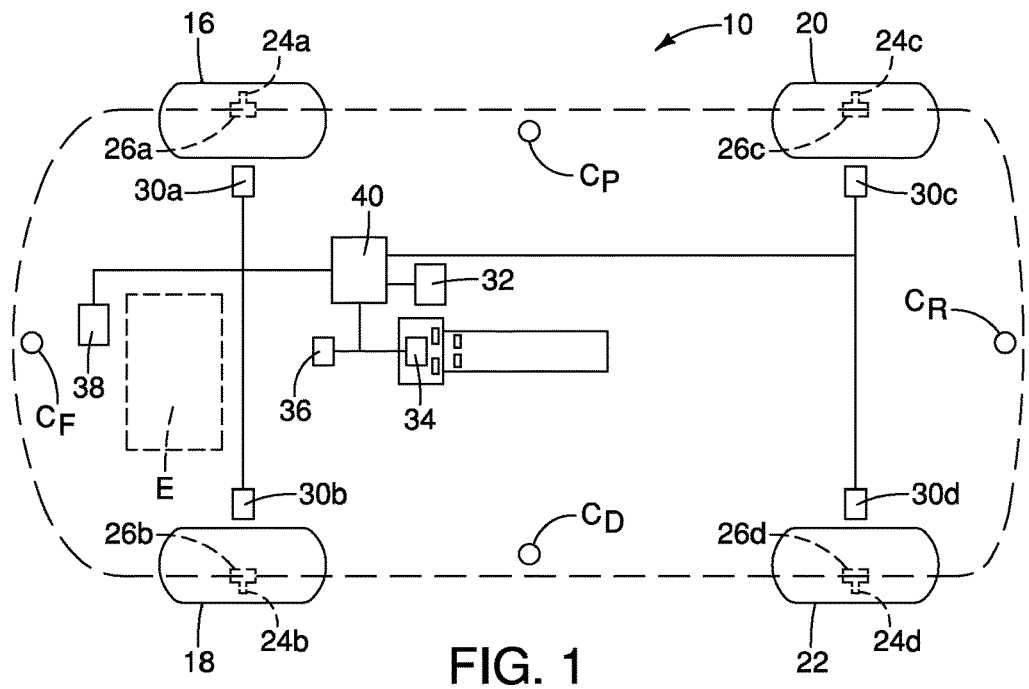
FIG. 1 is a schematic view of a vehicle with a vehicle body structure, tires and a tire monitoring system in accordance with one embodiment.

Referring initially to FIG. 1, a vehicle 10 with a tire monitoring system 12 is schematically illustrated in accordance with a first embodiment.

The vehicle 10 includes a vehicle body structure 14 shown schematically in FIG. 1. Various portions of the tire monitoring system 12 are installed to locations within or on the vehicle body structure 14, as described further below. The vehicle 10 includes four tires 16, 18, 20 and 22 that are rotatably attached to the vehicle body structure 14 in a conventional manner.

Further, the vehicle 10 further includes power plant E operated by a vehicle operator. The power plant E provides rotary power to at least two of the four tires in a conventional manner. It should be understood from the drawings and the description herein that the vehicle 10 further includes many structural components and vehicle systems that are conventional features, structures and systems. Since these features, structures and systems are conventional, further description is omitted for the sake of brevity.

Figure 5:
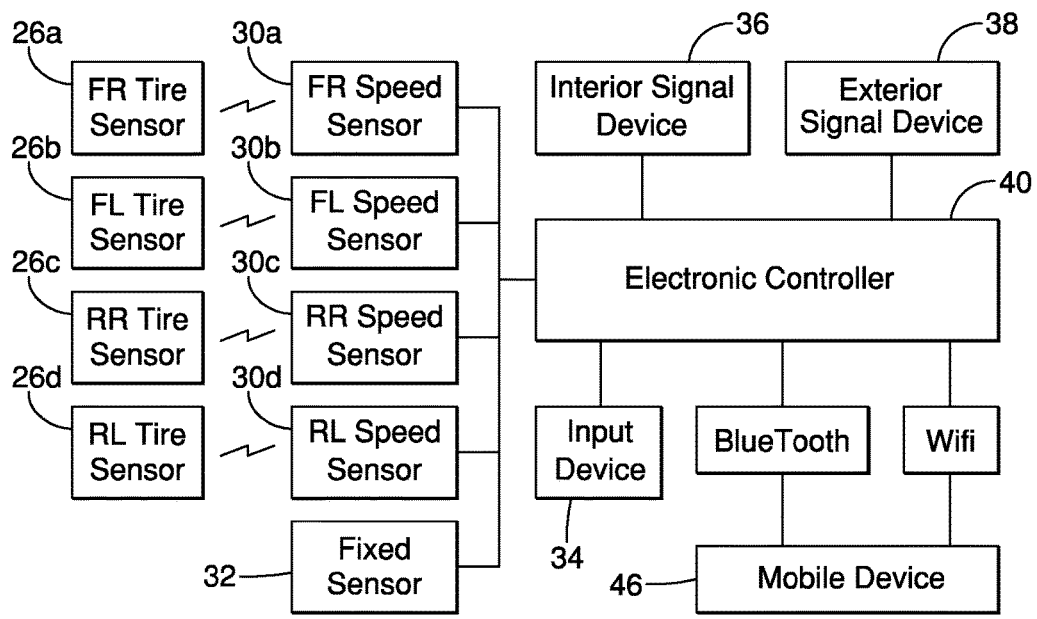
FIG. 5 is a block diagram showing the various elements of the tire monitoring system in accordance with the one embodiment.

The tire 16 includes a valve stem 24a, as is described in greater detail below. Each wheel includes a valve stem, such as the valve stems 24b, 24c and 24d shown in FIGS. 1 and 5. Further, each of the valve stems 24a, 24b, 24c and 24d has a corresponding tire pressure sensor 26a (tire 16), 26b (tire 18), 26c (tire 20) and 26d (tire 22) installed respectively to the tires 16, 18, 20 and 22, for rotation therewith. Since the four tires 16, 18, 20 and 22 are basically the same, the valve stems 24a, 24b, 24c and 24d the same and the tire pressure sensors 26a, 26b, 26c and 26d are all generally the same, description of only one tire 16, one valve stem 24a and one tire pressure sensor 26a is provided below. Each of the valve stems 24a-24d has a first end located outside the tire and a second end located inside the tire. The corresponding one of the tire pressure sensors 26a-26d is located at the second end of the valve stem within the tire.

It should be understood that description of one of the tires, one of the valve stems and corresponding tire pressure sensor, applies equally to all four tires, valve stems and corresponding tire pressure sensors.

A description of the tire monitoring system 12 is now provided with specific reference to FIGS. 1-5. The tire monitoring system 12 includes a plurality of rotation sensors 30a, 30b, 30c and 30d (also referred to as speed sensors), one for each of the wheels 16, 18, 20 and 22. The tire monitoring system 12 further includes a fixed sensor 32, an input device 34, an interior signaling device 36, an exterior signaling device 38 and an electronic controller 40.

There are four rotation sensors 30a, 30b, 30c and 30d, one for each tire. Since basic operation and function of each the rotation sensors 30a, 30b, 30c and 30d are identical, only one rotation sensor 30a is described herein below for the sake of brevity. It should be understood from the drawings and the description herein that the description of one rotation sensor applies equally to all of the rotation sensors.

Figure 6:
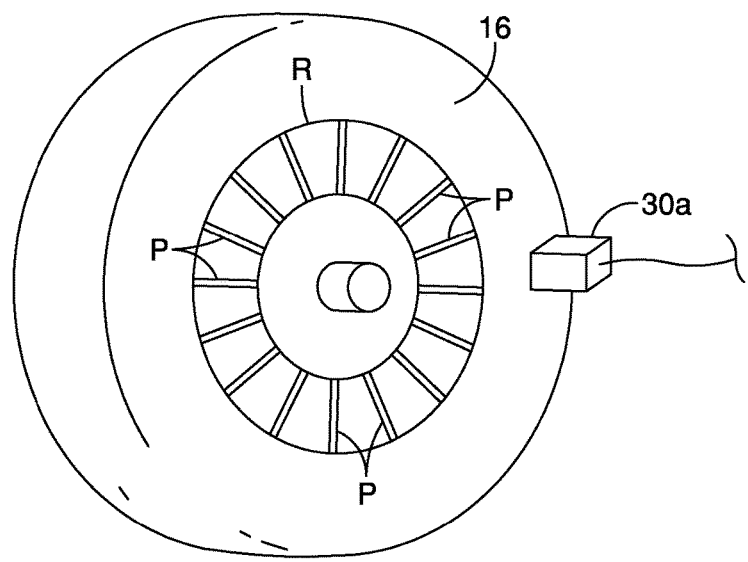
FIG. 6 is a perspective cutaway view of a tire rotor with a rotation sensor in order to determine relative position of the tire and the valve stem in accordance with the one embodiment.

The rotation sensor 30a adjacent to the tire 16 is configured to detect movement (rotation) of the tire 16. Specifically, the rotation sensor 30a produces rotation data that corresponds to rotation of the tire 16 and position of the valve stem 24a of the tire 16. The rotation sensor 30a can be any of a variety of sensors. For example, in the depicted embodiment, the rotation sensor 30a is part of an anti-lock brake system (not shown) that monitors the rotational speed of each of the four tires via the rotation sensors 30a. A portion of a brake rotor R (FIG. 6) of each axle/wheel assembly, or an attachment to the brake rotor, includes a plurality of metallic protrusions P circumferentially arranged on thereon. Rotational movement of the metallic protrusions with the tire 16 move in proximity to the rotation sensor 30a. As each of the metallic protrusions passes by the rotation sensor 30a, a magnetic field generated by the rotation sensor 30a is disturbed. The magnetic field disturbances produce signals that form the basis for determination of speed of the tire 16. Further, the metallic protrusions can include a marker (a larger or smaller protrusion) that is aligned or positioned relative to the valve stem 24 further providing a signal used to determine location of the valve stem 24 relative to the rotation sensor 30a.

Figure 2:
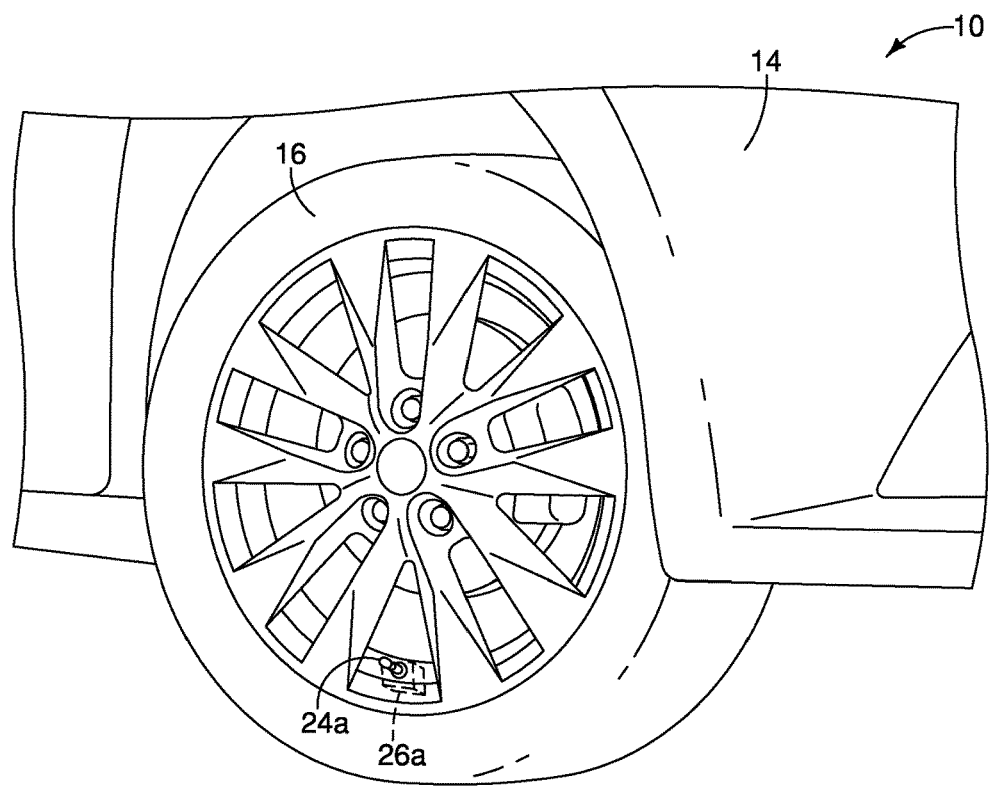
FIG. 2 is a perspective view of a front right side of the vehicle showing one of the tires with a valve stem that is in a lowermost orientation close to the ground in accordance with the one embodiment.
Figure 3:
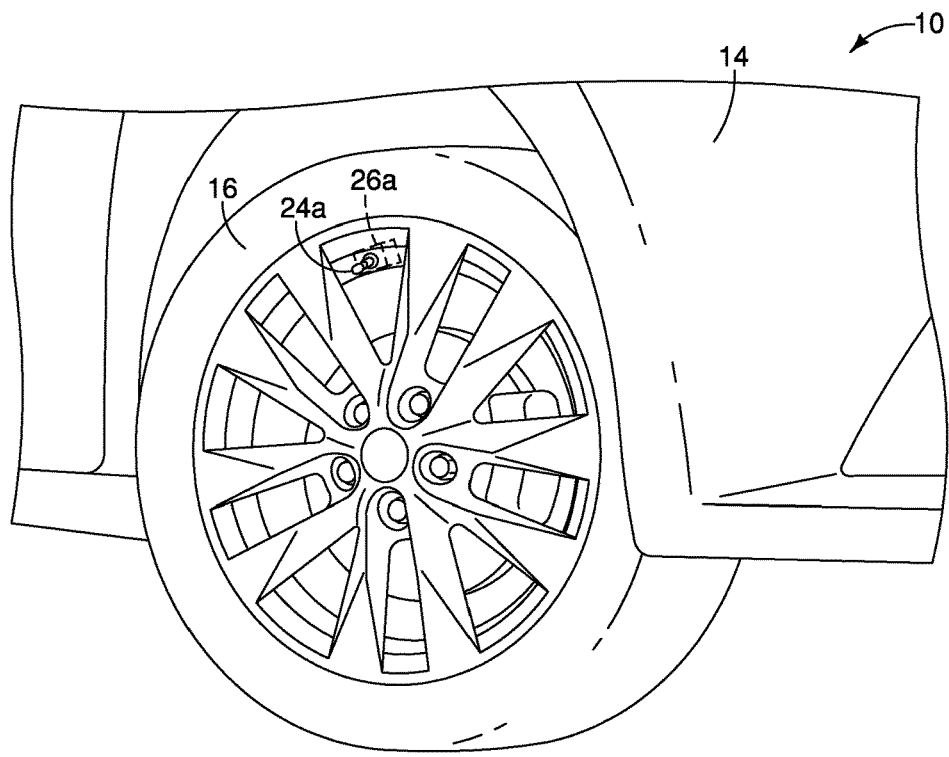
FIG. 3 is another perspective view of the front right side of the vehicle similar to FIG. 2, showing the one of the tires rotated moving the valve stem to an uppermost orientation well above the ground in accordance with the one embodiment.

Alternatively, the rotation sensor 30a can be a proximity sensor configured to detect proximity of the valve stem 24. For example, the rotation sensor 30a can be positioned above the axle that supports the tire 16. The rotation sensor 30a receives radio signals from the tire pressure sensor 26a associated with its corresponding valve stem 24. The radio signal from the tire pressure sensor 26a is weakest when the valve stem 24 is positioned at its lowest possible location, as shown in FIG. 2 (a 6 o'clock position). The radio signal from the tire pressure sensor 26a is strongest when the valve stem 24 is positioned at its highest possible location, as shown in FIG. 3 (a 12 o'clock position).

In both the depicted embodiment and the above mentioned alternative embodiment, the rotation sensor 30a can also be configured to receive tire identifying signals generated by the tire pressure sensor 26a, where each of the tire pressure sensors 26a, 26b, 26c and 26d produces a unique identifying signal along with a measurement of tire pressure for that tire such that the signal is correlated with the corresponding one of the tires 16, 18, 20 or 22. The vehicle 10 can further include side camera $C_F$, $C_R$, $C_D$ and $C_P$ (front, rear, driver's side and passenger's side cameras). The driver's side camera $C_D$ and the passenger's side camera $C_P$ are installed at distal end of respective side rear view mirrors (not shown) in a conventional manner. The driver's side camera $C_D$ has tires 18 and 22 in its field of view. The passenger's side camera $C_P$ has the tires 16 and 20 in its field of view.

The fixed sensor 32 is a radio signal receiver that receives tire pressure measurements and tire identification signals from each of the tire pressure sensors 26a, 26b, 26c and 26d. Additionally, the fixed sensor 32 can alternatively receive rotation data of valve stems from rotation sensor 30a, 30b, 30c, and 30d. Further, the fixed sensor 32 can alternatively receive rotation data of valve stems from the tire pressure sensor 26a, 26b, 26c, and 26d that receive rotation data from the rotation sensor 30a, 30b, 30c, and 30d.

The input device 34 can be any of a variety of vehicle devices, such as a display with associated buttons and/or switches that allow selection from various menus displayed therein, or the input device 34 can be a touch screen display such that a vehicle operator can touch items on a displayed menu and make a selection with the touch of a finger. The input device 34 is configured to display or otherwise indicate various vehicle condition related information and data, such as an indicate tire pressure of each of the tires 16, 18, 20 and 22. The input device 34 can also receive various a request to notify the vehicle operator when the valve stem 24a is in a predetermined angular orientation.

The interior signaling device 36 is a device installed within a passenger compartment of the vehicle 10 that is operated to provide various signals to the vehicle operator. For example, one signal can inform the vehicle operator that the tire stem 24a on the tire 16 is not in the predetermined angular orientation, while another signal can inform the vehicle operator that the tire stem 24a on the tire 16 is in the predetermined angular orientation. The interior signaling device 36 can be a lamp on the instrument panel of the vehicle 10, a buzzer, bell and/or chime, or can be a haptic device that, for example, causes the steering wheel (not shown) or front seat to vibrate. Further, the input device 34 can display a message, thereby serving as a signaling device.

The exterior signaling device 38 can be the headlights of the vehicle 10, a horn, or other noise making device.

The electronic controller 40 installed within the vehicle body structure 14 and is in electronic communication with the rotation sensors 30a-30d, the fixed sensor 32 the input device 34 and the signaling devices 36 and 38. The electronic controller 40 is configured to perform a plurality of tasks and operations, such as those described below.

Figure 7:
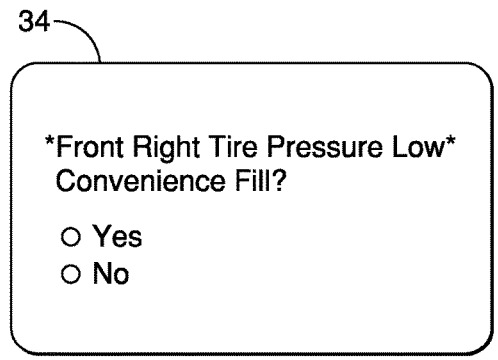
FIG. 7 is a first screen of a data message displayed on an input device of the tire monitoring system in accordance with the one embodiment.

The electronic controller 40 is configured such that in response to determining that current tire pressure in, for example, the tire 16 is below a predetermined value, the electronic controller 40 operates the input device 34 to display tire pressure information, in a manner such as that shown in FIG. 7. The screen displayed in FIG. 7 informs one of the vehicle operator and the vehicle passenger of a low tire pressure condition in tire 16. The display 34 in FIG. 7 also asks the vehicle operator if he or she wishes to use the "Convenience Fill" operation.

The electronic controller 40 is also configured such that in response to the input device 34 receiving the "Convenience Fill" request (selection of "Yes" in FIG. 7), the electronic controller 40 informs the vehicle operator that the of the angular rotation position of the valve stem 24a of the tire 16 is not optimal, requiring movement of the vehicle 10. In other words, when the electronic controller 40 determines that the valve stem 24a is not currently in the predetermined orientation, the electronic controller 40 operates the signaling device 36 to provide a first signal to at least one of the vehicle passenger and the vehicle operator indicating the improper location of the valve stem 24a. The electronic controller 40 can also (or alternatively) operate the display 34 to display the screen depicted in FIG. 8 which informs the vehicle operator which direction to move the vehicle 10 in order to re-position the valve stem 24a in order to orient the valve stem 24a to the predetermined orientation (12 o'clock in FIG. 3).

Figure 9:
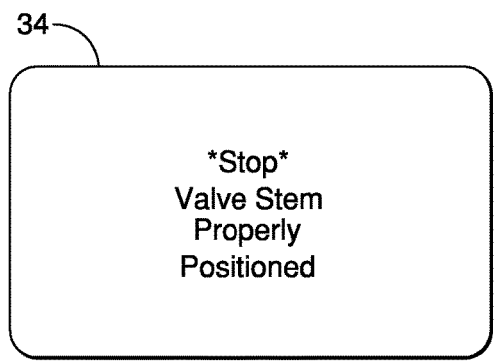
FIG. 9 is a third screen of a data message displayed on an input device of the tire monitoring system in accordance with the one embodiment.

The electronic controller 40 is further configured such that in response to the input device 34 receiving the request to orient the valve stem 24a to the predetermined orientation and determining that the valve stem is now in the predetermined orientation, the electronic controller 40 operates the signaling device 36 to provide a second signal to at least one of the vehicle passenger and the vehicle operator. The electronic controller 40 can also (or alternatively) operate the display 34 to display the screen depicted in FIG. 9 which informs the vehicle operator to stop movement of the vehicle 10 since the valve stem 24a is now oriented the predetermined orientation (12 o'clock in FIG. 3).

Figure 4:
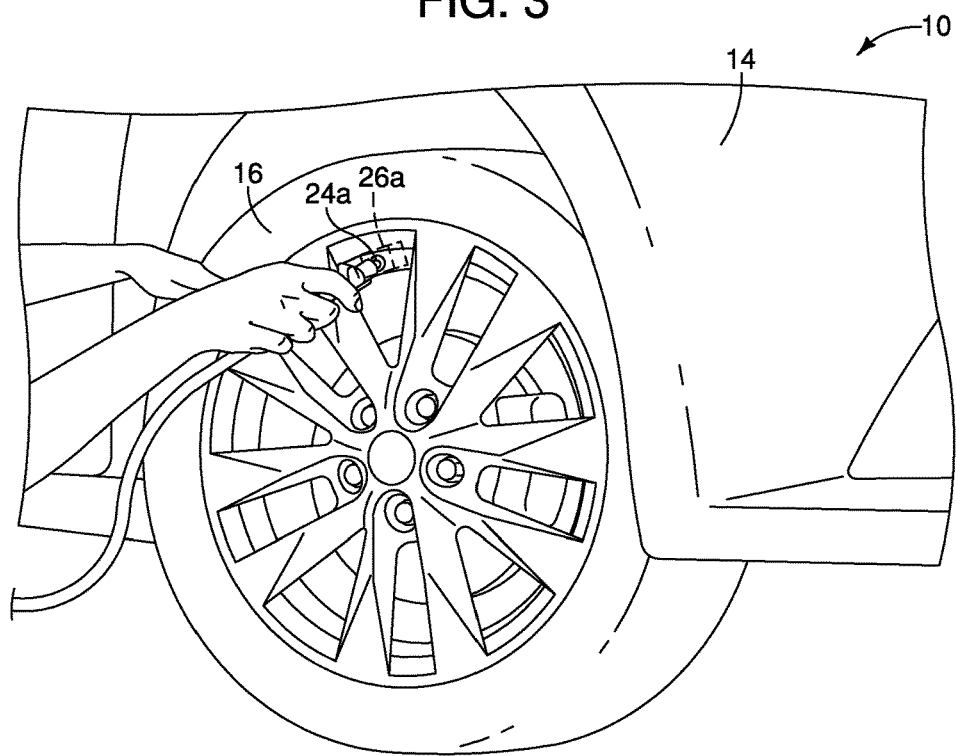
FIG. 4 is another perspective view of the front right side of the vehicle similar to FIG. 3, showing a person adding compressed air to the one of the tires with the valve stem in the uppermost orientation well above the ground in accordance with the one embodiment.
Figure 10:
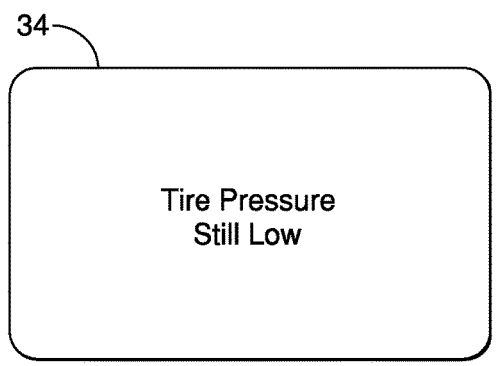
FIG. 10 is a fourth screen of a data message displayed on an input device of the tire monitoring system in accordance with the one embodiment.
Figure 11:
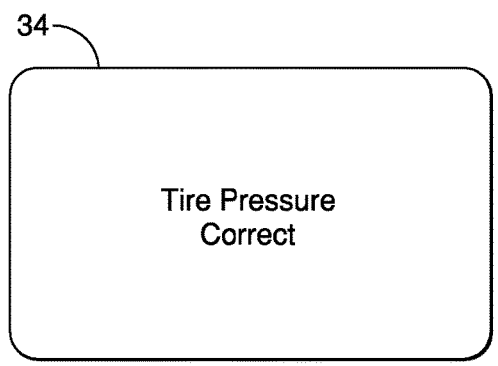
FIG. 11 is a fifth screen of a data message displayed on an input device of the tire monitoring system in accordance with the one embodiment.

The vehicle operator or passenger can now exit the vehicle 10 and add compressed air to the tire 16, as shown in FIG. 4. As air is added to the tire 16, the electronic controller 60 continues to monitor air pressure measurements from the tire pressure sensor 26a. If the tire 16 still low, the electronic controller 40 can operate the display 34 to display the screen depicted in FIG. 10, indicating that the air pressure is still below the desired level. Once the electronic controller 40 determines that addition of air to the tire has raised to current air pressure to a level that is at or above a predetermined value, the electronic controller 40 operates the exterior signaling device 38 and/or the interior signaling device 36, to provide a third signal to at least one of the vehicle passenger and the vehicle operator. The electronic controller 40 can also operate the display 34 to display the screen depicted in FIG. 11, indicating that the air pressure is now at the desired level.

The predetermined orientation of the valve stem 24a is defined as being plus or minus 10 degrees an upper most orientation of the valve stem 24a relative to rotation of the tire 16. This corresponds to an arc angle α shown in FIG. 3. FIG. 2 shows the valve stem 24a at a bottom most position (6 o'clock position). FIG. 2 is the least desirable position for the valve stem 24a when filling the tire 16 with compressed air as it requires a person or attendant to bend over to add air. FIG. 3 shows the valve stem 24a at the upper most position (12 o'clock position), which is an ideal or optimal position for the valve stem 24a when filling the tire 16 with compressed air. Persons or vehicle technicians with difficulty bending over benefit from this arrangement.

In the above describe embodiment, the interior signaling device 36 can be any one or more of the following: a vehicle buzzer, bell or chime (not shown) within the vehicle 10, an indicator on an instrument panel (not shown) within the vehicle body structure, the display 34, or a keyfob coordinated for use with the electronic controller 40, and a mobile device 46 (such as a mobile tablet and a mobile phone) that communicates with the electronic controller 40 via, for example, BlueTooth® and/or WiFi communication devices.

The exterior signaling device 38 can be one or more of the following: a vehicle horn and vehicle headlights.

The input device 34 can also be the mobile device 46 (a mobile tablet or a mobile phone) connected to the electronic controller 40 via BlueTooth® and/or WiFi communication devices. The mobile device 46 can include an App that connects with the electronic controller 40 such that the electronic controller 40 can display the above described menus and screens there on, ring and/or vibrate to provide one or more of the signals described above.

One example of logic used by the electronic controller is provided in the flowchart of FIG. 12, and is described below.

Figure 12:
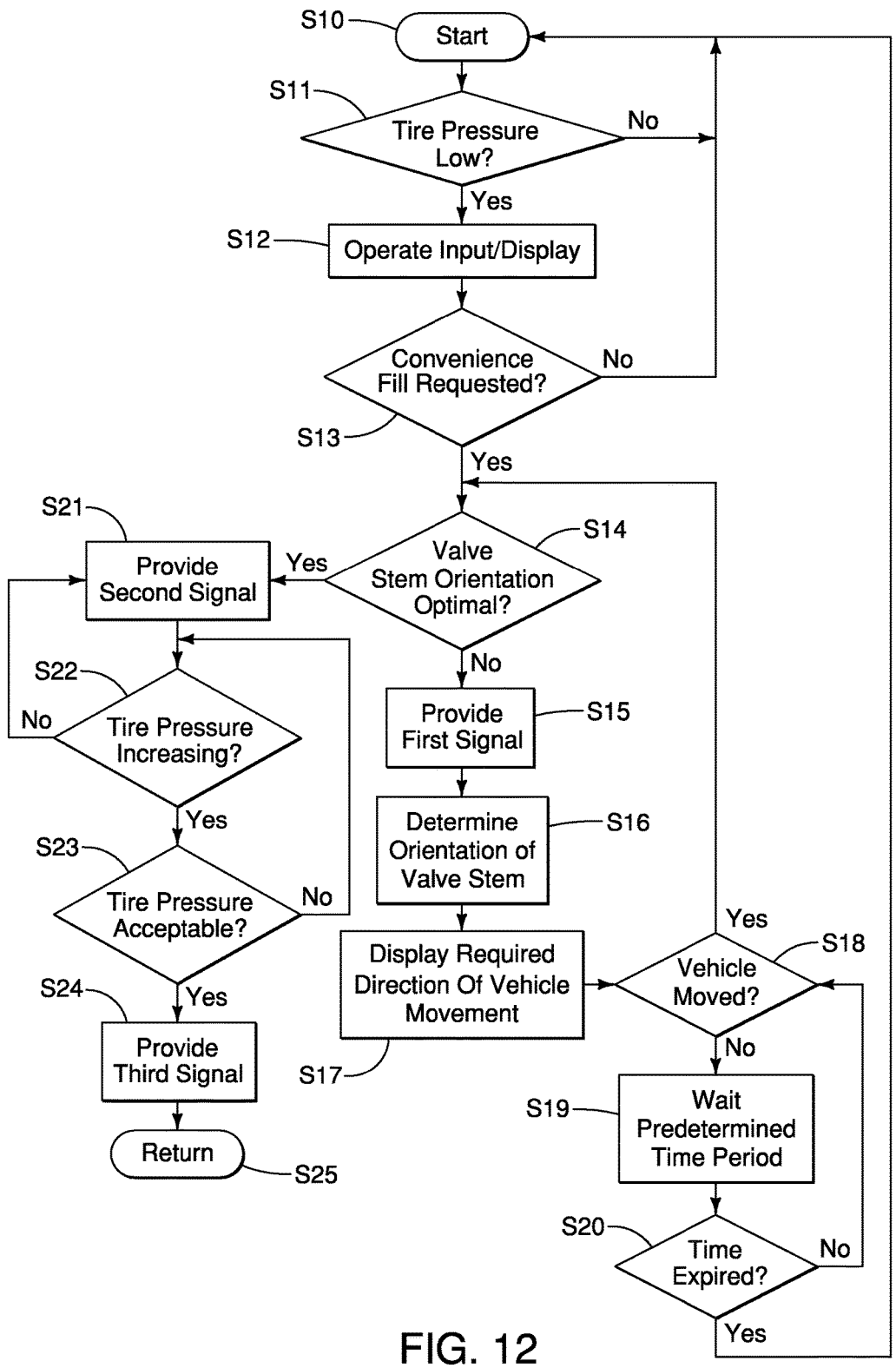
FIG. 12 is a flowchart showing one example of logic used to operate the tire monitoring device.

In FIG. 12 at step S10, the tire monitoring system 12 starts operating upon operation of the vehicle 10 and starting of the use of the power plant E. At step S11, the electronic controller 40 processes signals from the tire pressure sensors 26a-26d and determines whether or not air pressure is low in any one or more of the tires 16, 18, 20 and 22. If no, operation returns to step S10. If yes, then operation moves to step S12 where the electronic controller 40 operates the display 34 to show, for example, the screen depicted in FIG. 7 informing the vehicle operator and/or passenger that one of the tires (tire 16) has low air pressure.

Next at step S13, the electronic controller 40 determines whether or not "Convenience Fill" has been requested. If no, operation returns to step S10. If yes, operation moves to step S14. At step S14, the electronic controller 40 determines whether or not the valve stem 24a of the tire 16 is in an optimal orientation. If no, operation moves to step S15 where the electronic controller 40 emits a first signal via the interior signal device 36, such as a short tap of the horn, a beep, chime, etc., and/or operation of the input device or display 34 to show the screen depicted in FIG. 34. Next at step S16, the electronic controller 40 determines the exact orientation of the valve stem 26a (and the tire 16) and further determines how much vehicle movement will be needed to rotate the tire 16 such that the valve stem 26a is moved to within the arc angle α shown in FIG. 3.

Figure 8:
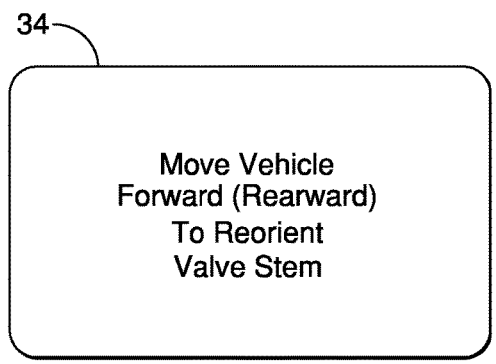
FIG. 8 is a second screen shot of a data message displayed on an input device of the tire monitoring system in accordance with the one embodiment.

Next at step S17, the electronic controller 40 displays the screen depicted in FIG. 8 indicating the direction of movement of the vehicle 10 necessary to position the valve stem 26a within the arc angle α shown in FIG. 3. At step S18, the electronic controller 40 determines whether or not the vehicle 10 is in motion. If yes, operation returns to step S14. If no, operation moves to step S19 where the electronic controller 40 waits a predetermined time, for example 10 seconds. Next at step S20, the electronic controller 40 determines whether or not the time has expired. If not, operation returns to step S18. If yes, then operation returns to step S10.

At step S14, if the electronic controller 40 determines that the valve stem 24a is now in the optimal orientation (within the arc angle α shown in FIG. 3), then the electronic controller 40 moves to step S21 where a second signal is provided indicating that the vehicle should be stopped. Further, the electronic controller 40 can optionally display the screen shown in FIG. 9.

Next at step S22, the electronic controller 40 monitors the tire pressure sensor 24a to determine whether or not a person is manually adding compressed air to the tire 16 within a predetermined time period. If not, operation returns to step S21. If yes, the electronic controller 40 continues to monitor the tire pressure sensor 24a to determine whether or not the desired air pressure has been achieved or is acceptable at step S23. At this time, the electronic controller 40 can optionally display the screen depicted in FIG. 10. At step S23, if no, operation returns to step S22. If yes, operation moves to step S24 where a third signal is provided via the exterior signal device 36, since the air pressure is being adjusted outside the vehicle 10. At the same time, the electronic controller 40 can optionally display the screen displayed in FIG. 11. Thereafter, operation moves to step S25 where the electronic controller 40 returns to step S10.

The first signal (step S15), the second signal (step S21) and the third signal (step S24) can be default set audio signals. Alternatively, the vehicle operator can use the input device 34 (the display 34) to scroll to a screen (not shown) that allows the vehicle operator to select differing combinations of signals to suit the desires of the vehicle operator. For example, the vehicle operator can configure the electronic controller 40 to: use the mobile device 46 for one or more of the signals; use the interior signal device 36 for one, two or all of the signals; and/or use the exterior signal device 38 for one, two or all of the signals.

With the "Convenience Fill" operations describe above, a vehicle operator can make the task of adding compressed air to one or more of the tires 16, 18, 20 and 22 easier by ensuring that the corresponding one of the valve stems 24a-24d is within the arc angle α shown in FIG. 3. Consequently, it is not necessary to bend over close to the ground when adding compressed air to one of the tires 16, 18, 20 and/or 22.

In an alternative embodiment, the cameras $C_D$ and $C_P$ can also be used to assist in the determination of orientation and angular position of the valve stems 24a-24d. The tires 16, 18, 20 and 22 can be identified by from data received by the fixed sensor 32 via radio signals received from each of the tire pressure sensors 26a, 26b, 26c and 26d. As mentioned above, each of the tire pressure sensors 26a, 26b, 26c and 26d can include a unique identification code transmitted with tire pressure, thereby identifying the tire where the sensor is installed. Alternatively, each of the tires 16, 18, 20 and 22 can be identified by a QR code that uniquely identifies each tire. The QR code need only be read by the cameras $C_D$ and $C_P$ once to identify the location of each tire, and can be re-entered when the tires are rotated. Further, a camera at a service center can further scan the QR code on each tire when installed, or, rotated, enter the identification and location of each tire for processing by the electronic controller 40.

The electronic controller 40 preferably includes a microcomputer with a tire pressure monitoring program that processes signals from its attached sensors and signal devices, and a display operating that controls the input device 34. The electronic controller 40 can also include other conventional components such as an input interface circuit, an output interface circuit, and storage devices such as a ROM (Read Only Memory) device and a RAM (Random Access Memory) device. The microcomputer of the electronic controller 40 is programmed to control the tire monitoring system 12. The memory circuit stores processing results and control programs such as ones for the various elements of the tire monitoring system 12 as run by the processor circuit of the electronic controller 40. The electronic controller 40 is operatively coupled to the various elements of the tire monitoring system 12 in a conventional manner. The internal RAM of the electronic controller 40 stores tire pressure measurements, tire position data with valve step location data, as well as statuses of operational flags and various control data. The internal ROM of the electronic controller 40 stores the commands and communication protocols communication with the various elements of the tire monitoring system 12 and for various operations thereof. The electronic controller 40 is capable of selectively controlling any of the components of the the tire monitoring system 12 in accordance with a stored control program. It will be apparent to those skilled in the art from this disclosure that the precise structure and algorithms for the electronic controller 40 can be any combination of hardware and software that will carry out the functions of the present invention.

The various vehicle components other than the tire monitoring system 12 are conventional components that are well known in the art. Since such vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the tire monitoring system. Accordingly, these terms, as utilized to describe the present invention should be interpreted relative to a vehicle equipped with the tire monitoring system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle tire monitoring system, comprising:
   a vehicle body structure;
   a vehicle tire rotatably attached to the vehicle body structure;
   a valve stem attached to the vehicle tire;
   a rotation sensor configured to receive rotation data corresponding to rotation of the valve stem;
   an input device configured to receive a request to orient the valve stem to a predetermined angular orientation;
   a signaling device configured to provide a signal to at least one of a vehicle passenger and a vehicle operator; and
   an electronic controller installed within the vehicle body structure and in electronic communication with the rotation sensor, the input device and the signaling device, the electronic controller being configured to:
   in response to the input device receiving the request to orient the valve stem to the predetermined angular orientation and determining that the valve stem is not currently in the predetermined angular orientation, the electronic controller operates the signaling device to provide a first signal to at least one of the vehicle passenger and the vehicle operator, and
   in response to the input device receiving the request to orient the valve stem to the predetermined angular orientation and determining that the valve stem is currently in the predetermined angular orientation, the electronic controller operates the signaling device to provide a second signal to at least one of the vehicle passenger and the vehicle operator.

2. The vehicle tire monitoring system according to claim 1, wherein
   the valve stem has a tire pressure sensor and is installed to the vehicle tire for rotation therewith, the electronic controller being in electronic communication with the tire pressure sensor.

3. The vehicle tire monitoring system according to claim 2, wherein
   the electronic controller is further configured such that in response to determining that current tire pressure is below a predetermined value, the electronic controller operates the input device informing one of the vehicle operator and the vehicle passenger of a low tire pressure condition.

4. The vehicle tire monitoring system according to claim 3, wherein
   the electronic controller is further configured such that in response to determining that addition of air to the vehicle tire has raised to the current tire pressure to a level that is at or above the predetermined value, the electronic controller operates the signaling device to provide a third signal to at least one of the vehicle passenger and the vehicle operator.

5. The vehicle tire monitoring system according to claim 2, wherein
   the electronic controller is further configured such that in response to determining that addition of air to the vehicle tire has raised current tire pressure to a level that is at or above a predetermined value, the electronic controller operates the signaling device to provide a third signal to at least one of the vehicle passenger and the vehicle operator.

6. The vehicle tire monitoring system according to claim 2, wherein
   the valve stem has a first end located outside the vehicle tire and a second end located inside the vehicle tire, with the tire pressure sensor located at the second end of the valve stem.

7. The vehicle tire monitoring system according to claim 1, wherein
   the vehicle body structure includes a speed sensor rotor with the vehicle tire being connected to the speed sensor rotor for rotation therewith, and
   the rotation sensor is configured to monitor movement of the speed sensor rotor and the vehicle tire.

8. The vehicle tire monitoring system according to claim 7, wherein
   the speed sensor rotor and the rotation sensor are part of an anti-lock braking system.

9. The vehicle tire monitoring system according to claim 1, wherein
   the predetermined angular orientation of the valve stem is defined as being plus or minus 10 degrees an upper most orientation of the valve stem relative to rotation of the vehicle tire.

10. The vehicle tire monitoring system according to claim 9, wherein
    the predetermined angular orientation of the valve stem is defined as the upper most orientation of the valve stem relative to rotation of the vehicle tire.

11. The vehicle tire monitoring system according to claim 1, wherein
    the signaling device is one or more of the following: a vehicle horn, vehicle headlights, a vehicle buzzer, an indicator on an instrument panel within the vehicle body structure, a display of the instrument panel; a bell within the vehicle body structure, a chime, a keyfob coordinated for use with the electronic controller, a mobile tablet and a mobile phone.

12. The vehicle tire monitoring system according to claim 1, wherein
    the input device is any one of the following: a display of an instrument panel within the vehicle body structure, a mobile tablet and a mobile phone.

13. The vehicle tire monitoring system according to claim 1, wherein
    the vehicle tire includes a plurality of vehicle tires rotatably attached to the vehicle body structure, each of the plurality of vehicle tires including a corresponding valve stem and tire pressure sensor,
    the rotation sensor being configured to receive corresponding tire pressure data from each of the tire pressure sensors, and
    the rotation sensor includes a plurality of rotation sensors, each of the plurality of the plurality of rotation sensors being located adjacent to a corresponding one of the plurality of vehicle tires.

14. The vehicle tire monitoring system according to claim 1, wherein the rotation sensor is located at an exterior portion of the vehicle body structure and is configured to transmit the rotation data to the electronic controller via radio transmissions.

15. A method of monitoring vehicle tire pressure, the method comprising:

providing a vehicle body structure with at least one vehicle tire rotatably attached thereto;

providing the at least one vehicle tire with a valve stem having a tire pressure sensor;

providing a fixed sensor mounted to the vehicle body structure, the fixed sensor receiving tire pressure data from the tire pressure sensor;

mounting a rotation sensor to the vehicle body structure proximate the at least one vehicle tire;

providing an input device configured to receive a request to orient the valve stem to a predetermined angular orientation;

providing a signaling device configured to provide a signal to at least one of a vehicle passenger and a vehicle operator;

providing the vehicle body structure with an electronic controller, the electronic controller being in electronic communication with the fixed sensor, the rotation sensor, the signaling device and the input device;

the electronic controller operating the input device informing one of the vehicle operator and the vehicle passenger of a low tire pressure condition in response to determining that current tire pressure of the at least one vehicle tire is below a predetermined value;

the electronic controller operating the signaling device to provide a first signal to at least one of the vehicle passenger and the vehicle operator in response to the request to orient the valve stem to a predetermined angular orientation, inputted to the input device to orient the valve stem to the predetermined angular orientation, and determining that the valve stem is not currently in the predetermined angular orientation, and the electronic controller operating the signaling device to provide a second signal to at least one of the vehicle passenger and the vehicle operator in response to receiving the request to orient the valve stem to the predetermined angular orientation and in response to determining that the valve stem is currently in the predetermined angular orientation, and the electronic controller operating the signaling device to provide a third signal to at least one of the vehicle passenger and the vehicle operator in response to determining that addition of air to the at least one vehicle tire has raised the current tire pressure of the at least one vehicle tire to a level that is at or above the predetermined value.

* * * * *